UNITED STATES PATENT OFFICE.

TALIAFERRO P. SHAFFNER, OF LOUISVILLE, KENTUCKY.

Letters Patent No. 86,701, dated February 9, 1869.

IMPROVEMENT IN PRESERVING NITRO-GLYCERINE, &c.

The Schedule referred to in these Letters Patent and making part of the same.

*To all whom it may concern:*

Be it known that I, TALIAFERRO P. SHAFFNER, of Louisville, State of Kentucky, have discovered or invented a new and improved Method of Preserving Nitro-Glycerine; and I do declare that the following is a full and exact description thereof.

The nature of my discovery or invention consists in placing in any can, canister, bottle, or vessel containing nitro-glycerine, nitroleum, nitrine, or other equivalent, pure water.

To enable others skilled in the art to make and use my invention or discovery, I will proceed to describe the process employed.

It has been customary to prepare nitro-glycerine by washing with soda, or other alkali, to remove excess of acid. The alkali, thus combined with the nitro-glycerine, seriously impairs the freedom of its explosion in use.

My invention consists in packing or stowing nitro-glycerine which has been thus treated in pure water, in order to remove any excess of alkali or acid, and, at the same time, preserve it from danger of explosion.

The water engages all the free acid that may be liberated from the nitro-glycerine. It prevents the said acid from acting upon the cork, or other carbon, that may be exposed to the liquid in the can. It prevents the concentration of heat in the vessel containing the nitro-glycerine than the boiling, certainly not greater than 300° Fahrenheit. It keeps in a pure condition the nitro-glycerine, and it cushions it when in a frozen state. (It must be remembered that nitro-glycerine freezes at 45° Fahrenheit.) It preserves, to a certain extent, the metallic vessels containing the nitro-glycerine from rusting. It prevents the generation of gases, and tends to equalize the density of the air in the vessel.

The more water that may be used, the better, but one pint of water to two gallons of nitro-glycerine, &c., will be sufficient.

Having now fully described the nature of my discovery or invention, sufficiently full and distinct to enable others skilled in the art to execute the same,

What I claim, and desire to secure by Letters Patent, as my discovery or invention, is—

The placing and keeping of water in vessels containing nitro-glycerine, &c., for transportation or storing.

To the above specification of my invention, I have signed my hand, this 12th day of January, 1869.

TAL. P. SHAFFNER.

Witnesses:
    E. A. L. ROBERTS,
    W. M. SHAFFNER.